(12) United States Patent
Miyakoshi et al.

(10) Patent No.: US 10,717,192 B2
(45) Date of Patent: Jul. 21, 2020

(54) ROBOT MOTION PROGRAM GENERATING APPARATUS

(71) Applicant: DENSO WAVE INCORPORATED, Chita-gun, Aichi-pref. (JP)

(72) Inventors: Yoshihiro Miyakoshi, Chita-gun (JP); Atsuko Sugano, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 327 days.

(21) Appl. No.: 15/907,758

(22) Filed: Feb. 28, 2018

(65) Prior Publication Data

US 2018/0250819 A1    Sep. 6, 2018

(30) Foreign Application Priority Data

Mar. 3, 2017   (JP) ................................ 2017-040800

(51) Int. Cl.
*B25J 9/16*    (2006.01)

(52) U.S. Cl.
CPC ... *B25J 9/1666* (2013.01); *G05B 2219/39433* (2013.01); *G05B 2219/40518* (2013.01); *Y10S 901/02* (2013.01); *Y10S 901/49* (2013.01)

(58) Field of Classification Search
None
See application file for complete search history.

(56) References Cited

U.S. PATENT DOCUMENTS

| 8,125,897 B2* | 2/2012 | Ray | H04L 41/0896 370/229 |
| 2007/0185946 A1* | 8/2007 | Basri | G06K 9/34 708/200 |
| 2008/0049629 A1* | 2/2008 | Morrill | H04L 41/00 370/250 |
| 2008/0049630 A1* | 2/2008 | Kozisek | H04L 41/0823 370/250 |
| 2008/0049631 A1* | 2/2008 | Morrill | H04L 41/5009 370/250 |
| 2008/0049775 A1* | 2/2008 | Morrill | H04L 41/147 370/419 |

FOREIGN PATENT DOCUMENTS

JP    2013-046938 A    3/2013

* cited by examiner

*Primary Examiner* — Bhavesh V Amin
(74) *Attorney, Agent, or Firm* — Oliff PLC

(57) ABSTRACT

A robot motion program generating apparatus generates a motion program for moving a robot, avoiding an obstacle. The apparatus comprises a section inputting a taught trajectory of the robot, a section setting a tolerance region around the trajectory inputted by the trajectory inputting section, a section setting a motion-point group that is a collection of the motion points, by determining motion points of the robot in the tolerance region set by the region setting section, and iterating a task of connecting a source motion point to a subsequent motion point through a line segment, avoiding the obstacle, starting from one end and ending at the other end of the trajectory, and a section generating the motion program, based on the motion-point group set by the point-group setting section.

20 Claims, 8 Drawing Sheets

ROBOT MOTION PROGRAM GENERATING APPARATUS

CROSS-REFERENCE TO RELATED APPLICATION

This application is based on and claims the benefit of priority from earlier Japanese Patent Application No. 2017-040800 filed Mar. 3, 2017 the description of which is incorporated herein by reference.

BACKGROUND

Technical Field

The present disclosure relates to a robot motion generating apparatus that generates a motion program for moving a robot.

Related Art

For example, this type of apparatus is disclosed in a patent document JP-2013-46938 A. According to this patent document, a robot trajectory is divided into line segments. If the divided line segments interfere with an obstacle, the divided line segments are further divided into smaller line segments to thereby create a linear robot motion that will not interfere with the obstacle.

The apparatus disclosed in the patent document JP-2013-46938 A uses a trajectory generated in advance to determine motion points thereon. Therefore, if the trajectory generated in advance is not appropriate, the robot may closely pass by the obstacle.

SUMMARY

It is thus desired that a robot motion program generating apparatus appropriately generates a robot motion program under conditions where the taught trajectory varies.

According to a first aspect of the present disclosure, a robot motion program generating apparatus generates a motion program for moving a robot, avoiding an obstacle. The apparatus includes a trajectory inputting section, a region setting section, a point-group setting section, and a program generating section. The trajectory inputting section provides input of a taught trajectory of the robot. The region setting section sets a tolerance region around the trajectory that is inputted by the trajectory inputting section, the tolerance region being a region providing a tolerance around motion points of the robot. The point-group setting section sets a motion-point group that is a collection of the motion points, by determining motion points of the robot in the tolerance region that is set by the region setting section, and iterating a task of connecting a source motion point to a subsequent motion point through a line segment, avoiding the obstacle, starting from one end and ending at the other end of the trajectory. The program generating section generates the motion program, based on the motion-point group that is set by the point-group setting section.

With this configuration, a taught robot trajectory is inputted by the trajectory inputting section. Then, the trajectory inputting section sets a tolerance region around the trajectory that is inputted by the trajectory inputting section. This tolerance region provides a tolerance around motion points of the robot. Thus, motion points of the robot can be set not only on the trajectory, but also around the trajectory.

Then, the point-group setting section determines motion points of the robot in the tolerance region that is set by the region setting section. The point-group setting section iterates a task of connecting a source motion point to a subsequent motion point through a line segment, avoiding an obstacle, starting from one end and ending at the other end of the trajectory to thereby set a motion-point group that is a collection of the motion points. Thus, appropriate motion points are determined so that a motion-point group can be set on the taught trajectory and/or in the tolerance region including the taught trajectory. Then, the program generating section generates a motion program, based on the motion-point group that is set by the point-group setting section. Consequently, the motion program generating apparatus is able to generate an appropriate motion program.

According to a second aspect of the present disclosure, the point-group setting section determines motion points on the trajectory that is inputted by the trajectory inputting section to specify a first motion line by iterating a task of connecting a source motion point to a subsequent motion point through a line segment, starting from one end and ending at the other end of the trajectory, changes positions of the motion points specifying the first motion line in the tolerance region to specify a second motion line by connecting between the position-changed motion points through line segments, and determines a collection of the motion points specifying the second motion line as being the motion-point group, in the case where a similarity between the trajectory and the second motion line is higher than a similarity between the trajectory and the first motion line.

With this configuration, motion points are determined on the trajectory inputted from the trajectory inputting section. Then, a task of connecting a source motion point to a subsequent motion point through a line segment is iterated, starting from one end and ending at the other end of the trajectory to specify a first trajectory. In other words, the first motion line is specified by determining a plurality of points on the trajectory so that each line segment connecting between the motion points can avoid an obstacle.

In the tolerance region set by the region setting section, the positions of the motion points specifying a first motion line are changed, and the provisional motion points at the changed positions are connected through line segments to specify a second motion line. Then, if the similarity between the trajectory and the second motion line is higher than the similarity between the trajectory and the first motion line, the collection of the motion points specifying the second motion line is determined as being a motion-point group. Thus, the collection of the motion points specifying the motion line that is similar to the taught trajectory can be determined as being a motion-point group. Accordingly, while an appropriate motion-point group is being set in the tolerance region, a motion program can be generated, with which a trajectory similar to the taught trajectory is produced.

According to a third aspect of the present disclosure, the point-group setting section changes positions of the motion points specifying the first motion line in the tolerance region that is set by the region setting section, to iterate a task of specifying a second motion line a predetermined number of times by connecting between the position-changed motion points through line segments, and determines a collection of the motion points specifying a second motion line with a highest similarity to the trajectory, as being the motion-point group.

With this configuration, the following task is iterated a predetermined number of times in the tolerance region. The task is to change the positions of the motion points specifying a first motion line and connect the motion points at the changed positions through line segments to thereby specify a second motion line. Then, the collection of the motion points specifying the second motion line that maximizes the similarity to the trajectory is determined as being a motion-point group. Accordingly, a motion program can be generated, with which a trajectory closer to the taught trajectory is produced.

If the trajectory inputted by the trajectory inputting section is not appropriate, the first motion line may closely pass by the obstacle.

In this regard, according to a fourth aspect of the present disclosure, the point-group setting section is so configured to change positions of the motion points so that a distance between the second motion line and the object is larger than a predetermined distance, when changing positions of the motion points specifying the first motion line in the tolerance region that is set by the region setting section to specify a second motion line by connecting between the position-changed motion points through line segments. With this configuration, the collection of the motion points specifying the second motion line, whose distance to the obstacle is larger than a predetermined distance, can be determined as being a motion-point group. Accordingly, a motion program can be generated so that the distance between the obstacle and the trajectory is larger than a predetermined distance.

According to a fifth aspect of the present disclosure, the program generating section generates the motion program so that the second motion line serves as a trajectory of the robot.

In a direct teaching method where a trajectory is taught by the user directly moving the robot, the user's hands movement causes unwanted curved lines in the taught trajectory. If this trajectory with many unwanted curved lines is used as a basis for generating a motion program that realizes the trajectory, the robot may incessantly repeat minimal acceleration and deceleration and thus may reduce motion efficiency.

In this regard, with the configuration set forth above, a motion program is generated so that the second motion line connecting the motion points through line segments serves as a trajectory of the robot. Accordingly, the trajectory can avoid including many unwanted curved lines, thereby curbing lowering of motion efficiency.

According to a sixth aspect of the present disclosure, a robot motion program generating apparatus that generates a motion program for moving a robot, avoiding an obstacle, includes a trajectory inputting section, a region setting section setting, a point-group setting section, a target value setting section, and a program generating section. The trajectory inputting section provides input of a taught trajectory of the robot. The region setting section sets a tolerance region around the trajectory inputted by the trajectory inputting section, the tolerance region being a region providing a tolerance around motion points of the robot. The point-group setting section sets a motion-point group that is a collection of the motion points, by determining motion points of the robot in the tolerance region set by the region setting section, and iterating a task of connecting a source motion point to a subsequent motion point through a line segment, avoiding the obstacle, starting from one end and ending at the other end of the trajectory. The target value setting section sets a target approximate value that is a target value approximating the motion-point group that is set by the point-group setting section to the trajectory that is inputted by the trajectory inputting section. The program generating section generates the motion program, based on the motion-point group set by the point-group setting section.

In the apparatus, the point-group setting section carries out tasks of:

determining a minimum number of motion points on the trajectory that is inputted by the trajectory inputting section to specify a first motion line by iterating a task of connecting a source motion point to a subsequent motion point through a line segment, starting from one end and ending at the other end of the trajectory;

determining a collection of the motion points specifying the first motion line as being the motion-point group, in the case where an approximation degree of the collection of the motion points specifying the first motion line, relative to the trajectory, exceeds the target approximate value that is set by the target value setting section;

changing at least positions or a number of the motion points specifying the first motion line in the tolerance region that is set by the region setting section, in the case where an approximation degree of the collection of the motion points specifying the first motion line, relative to the trajectory does not exceed the target approximate value that is set by the target value setting section, to specify a second motion line by connecting between the position-changed motion points through line segments;

determining a collection of the motion points specifying the second motion line as being the motion-point group, in the case where an approximation degree of the collection of the motion points specifying the second motion line, relative to the trajectory, exceeds the target approximate value that is set by the target value setting section; and iterating a task of specifying the second motion line, in the case where an approximation degree of the collection of the motion points specifying the second motion line, relative to the trajectory does not exceed the target approximate value that is set by the target value setting section.

With this configuration, the target value setting section sets a target approximate value with which the motion-point group that is set by the point-group setting section is approximated to the trajectory that is inputted from the trajectory inputting section. The point-group setting section determines a minimum number of motion points on the trajectory that is inputted from the trajectory inputting section to specify a first motion line by iterating a task of connecting a source motion point to a subsequent motion point through a line segment, starting from one end and ending at the other end of the trajectory. Then, if the approximation degree of the collection of the motion points specifying the first motion line, relative to the trajectory, exceeds the target approximate value, the collection of the motion points specifying the first motion line is determined as being a motion-point group. Thus, a motion program can be generated with which a trajectory based on a minimum number of motion points is produced, and thus the motion efficiency of the robot is enhanced. Since a motion program is generated based on a minimum number of motion points, in the occurrence of variation in the inputted trajectory, the trajectory to be generated can avoid including unwanted curved lines, thereby curbing lowering of motion efficiency.

If the approximation degree of the collection of the motion points specifying a first motion line, relative to the trajectory does not exceed the target approximate value, at least the positions or the number of motion points specifying the first motion line in the tolerance region are/is changed, followed by iteration of the task of connecting between the position-changed motion points through line segments to thereby specify a second motion line. If the approximation degree of the collection of the motion points specifying the second motion line, relative to the trajectory, exceeds the target approximate value, the collection of the motion points specifying the second motion line is determined as being a motion-point group. Thus, by changing at least the positions or the number of motion points, the approximation degree of the collection of the motion points, relative to the trajectory is ensured to exceed the target approximate value.

If the approximation degree of the collection of the motion points specifying the second motion line does not exceed the target approximate value, the task of specifying the second motion line is iterated. Thus, by iterating the change of at least the positions or the number of motion points, the approximation degree of the collection of the motion points, relative to the trajectory is ensured to exceed the target approximate value. In this case as well, a motion program can be generated with which a trajectory based on a minimum number of motion points is produced, and thus the motion efficiency of the robot is enhanced. Since a motion program is generated based on a minimum number of motion points, in the occurrence of variation in the inputted trajectory, the trajectory to be generated can avoid including unwanted curved lines, thereby curbing lowering of motion efficiency.

According to a seventh aspect of the present disclosure, the point-group setting section is so configured that, as the number of the motion points increases, an approximation degree of the collection of the motion points specifying the second motion line, relative to the trajectory is less likely to be determined as exceeding the target approximate value that is set by the target value setting section.

With this configuration, as the number of the motion points increases, an approximation degree of the collection of the motion points specifying the second motion line, relative to the trajectory is less likely to be determined as exceeding the target approximate value. Accordingly, a motion program can be generated with which a trajectory based on a minimum number of motion points is produced.

According to an eighth aspect of the present disclosure, the region setting section sets the tolerance region around the trajectory so as to have a larger width in an intermediate portion of the trajectory than in both end portions of the trajectory.

In general, both end portions of a trajectory are taught as being a start point and an end point of the trajectory of the robot. Therefore, a motion program of the robot needs to be generated so that the motion lines pass through both end portions of the trajectory. However, when the intermediate portion of the trajectory is concerned, the motion lines need not necessarily pass through taught positions. Accordingly, the motion points can be set avoiding the obstacle.

In this regard, with the configuration set forth above, the tolerance region is established so as to have a larger width in the intermediate portion of the trajectory than in both end portions of the trajectory. Accordingly, at positions of the tolerance region distanced from both end portions of the trajectory, motion points can be easily set avoiding the obstacle and thus the number of the motion points to be set can be minimized. As a result, a trajectory with a simple shape can be produced.

DETAILED DESCRIPTION OF THE PREFERRED EMBODIMENTS

With reference to the drawings, an embodiment of the present disclosure will be described. The following description embodies a robot system that assembles a machine or the like in machine assembly factories.

Figure 1A:
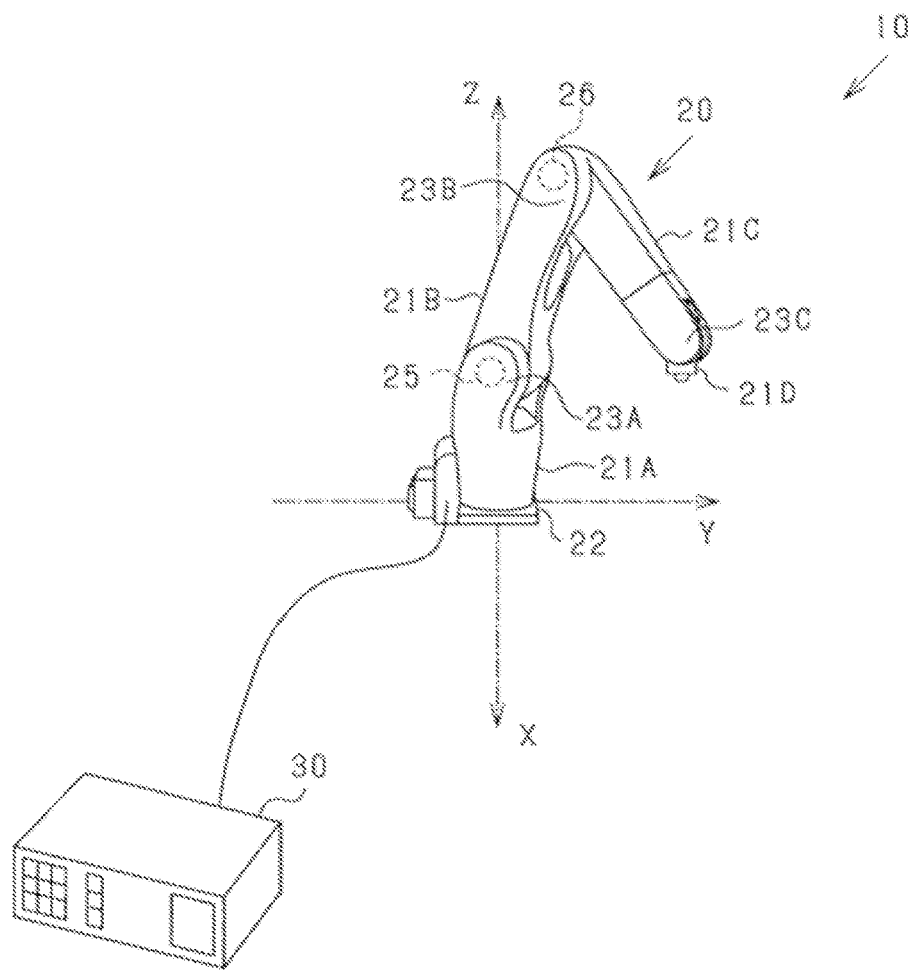
FIG. 1A is a perspective view illustrating a robot system.
Figure 1B:
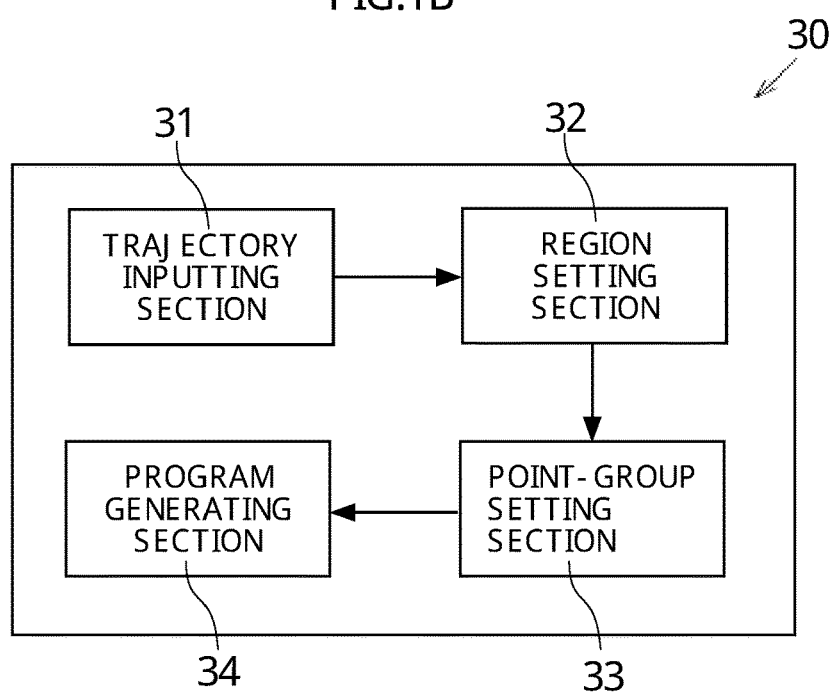
FIG. 1B is a block diagram illustrating a controller.

FIG. 1A is a perspective view illustrating a robot system 10. As shown in FIG. 1A, the robot system 10 includes a robot 20 and a controller 30. FIG. 1B is a block diagram illustrating the controller 30.

The robot 20 is a vertical articulated robot and includes a plurality of links (driven parts) and a base 22. The plurality of links include, sequentially from the base 22 side, a link 21A, a link 21B, a link 21C and a link (hand) 21D. The link 21A is connected to the link 21B through a joint 23A. The link 21B is connected to the link 21C through a joint 23B. The link 21C is connected to the hand 21D through a joint 23C. The link 21C is made up of two parts that rotate relative to each other.

The joints 23A, 23B and 23C are respectively provided with servomotors. FIG. 1A shows servomotors 25 and 26 for the joints 23A and 23B, respectively, with the servomotor for the joint 23C omitted. When these servomotors are activated/rotated, the links 21A, 21B, 21C and 21D are driven. Each servomotor includes an electromagnetic brake that applies brakes to the output shaft of the servomotor, and an encoder that outputs pulse signals according to the rotation angle of the output shaft. With the links 21A, 21B, 21C and 21D being driven, the robot 20 carries out work such as of assembling parts to a workpiece or conveying a workpiece.

The controller 30, which serves as an apparatus for generating a motion program, includes a CPU, a ROM, a RAM, a drive circuit, a position detection circuit, and an input/output interface. The ROM stores a system program, a motion program, and other programs for the robot 20. The RAM stores parameters, and the like when these programs are executed. The position detection circuit receives inputs of detection signals of the encoders. Based on the detection signals of the encoders, the position detection circuit detects rotation angles of the servomotors provided to the respective joints. The CPU executes the motion program to control the rotation angles of the joints of the links 21A, 21B, 21C and 21D so as to be the respective target rotation angles, based on the position information inputted from the position detection circuit. The controller 30 generates a motion program, based on the trajectory of the robot 20 taught by the user to move the robot 20, avoiding the obstacle. As shown in FIG. 1B, the controller 30 also includes a trajectory inputting section 31, a region setting section 32, a point-group setting section 33, and a program generating section 34.

Figure 2:
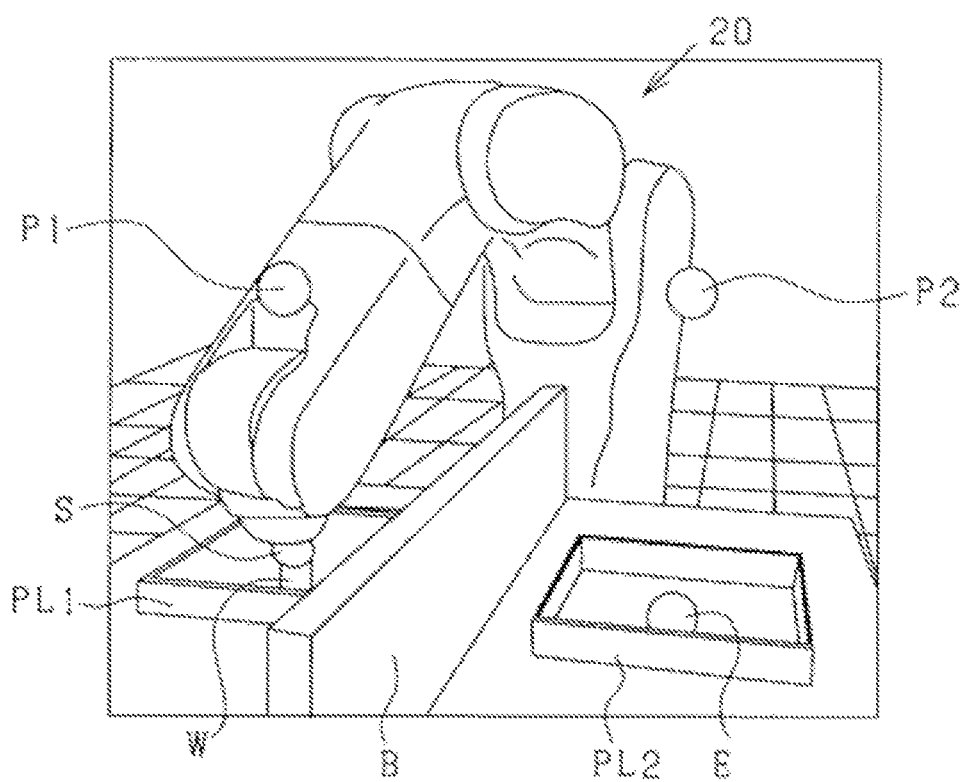
FIG. 2 is a perspective view illustrating a mode of teaching a trajectory based on via points.

FIG. 2 is a perspective view illustrating a mode of teaching a trajectory based on via points. Description herein is provided by way of an example of conveying a workpiece W from a palette PL1 to a palette PL2, avoiding an obstacle B.

As shown in FIG. 2, the user teaches the robot 20 the positions of four points which are a start point S, a via point P1, a via point P2 and an end point E. For example, when teaching the positions of these points S, P1, P2 and E, the user may operate a mouse or the like to set the points S, P1, P2 and E on an image used for simulating the motion of the robot 20. Alternatively, the user may move the hand 21D of the robot 20 using an operation instrument to set the points S, P1, P2 and E while visually recognizing the hand position of the robot 20. To appropriately set the points S, P1, P2 and E using these methods, the user needs to be a high-skill person.

Figure 3:
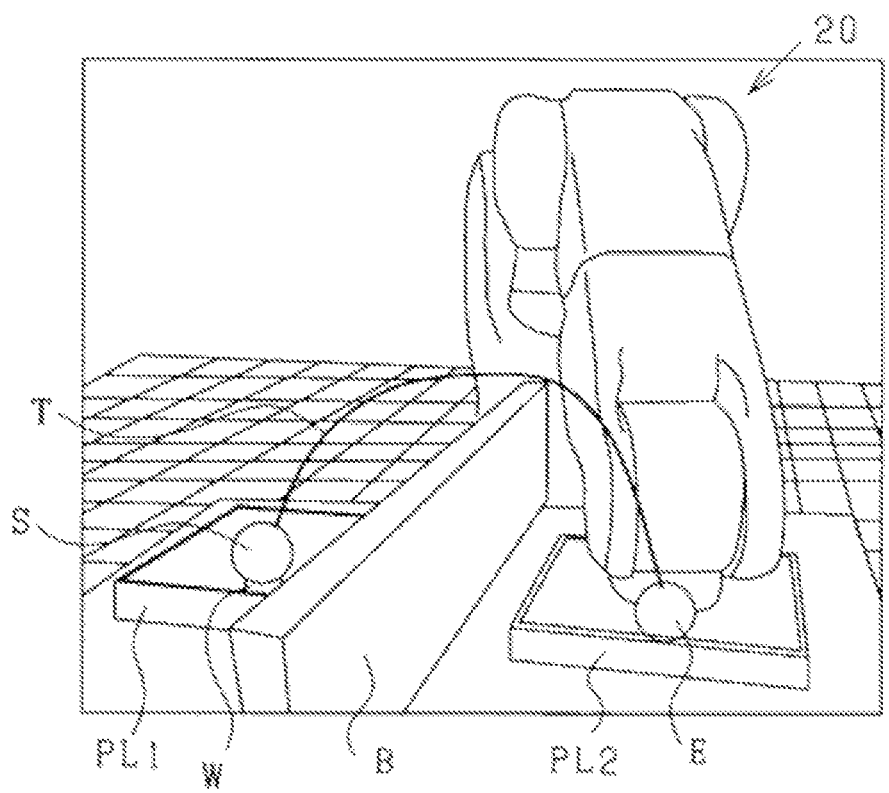
FIG. 3 is a perspective view illustrating a mode of teaching a trajectory based on a motion line.

FIG. 3 is a perspective view illustrating a mode of teaching a trajectory based on a motion line. Again, description herein is provided by way of an example of conveying the workpiece W from the palette PL1 to the palette PL2, avoiding the obstacle B.

As shown in FIG. 3, the user teaches the robot 20 the position of the start point S, the pattern of a trajectory T (motion line), and the position of the end point E. For example, when teaching the position of the start point S, the pattern of the trajectory T, and the position of the end point E, the user may use a direct teaching method. Specifically, the user may directly teach the robot 20 the position of the start point S and then may directly move the hand 21D of the robot 20 for the setting of the trajectory T, followed by teaching the end point E. Alternatively, the user may operate a mouse or the like to successively move the pointer indicating the position of the hand 21D of the robot 20 on an image used for simulating the motion of the robot 20, for the setting of the start point S, the trajectory T, and the end point E. When these methods are used, the taught trajectory T may include many unwanted curved lines due to the user's hands movement. If this trajectory T with many unwanted curved lines is used as a basis for generating a motion program that realizes the trajectory, the robot 20 may repeat tremors of acceleration and deceleration and thus may reduce motion efficiency.

Also, if the taught trajectory T is not appropriate, the robot 20 may closely pass by the obstacle B. In the present embodiment, the controller 30 generates a motion program as set forth below. FIGS. 4A to 4D are schematic diagrams illustrating an overview of generating a motion program.

Figure 4A:
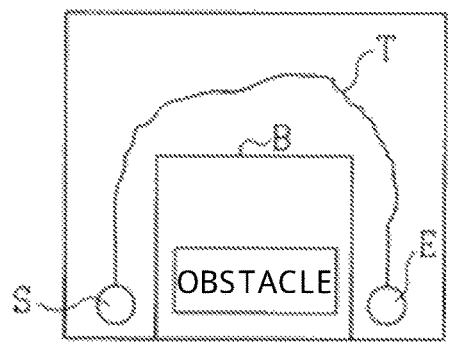
FIGS. 4A to 4D are schematic diagrams illustrating an overview of generating a motion program.

FIG. 4A shows a start point S, a trajectory T, and an end point E as taught by the user. As mentioned above, the trajectory T is taught based on a motion line and is ensured to avoid the obstacle B. The controller 30 (corresponding to the trajectory inputting section 31) provides input of the taught trajectory T.

Figure 4B:
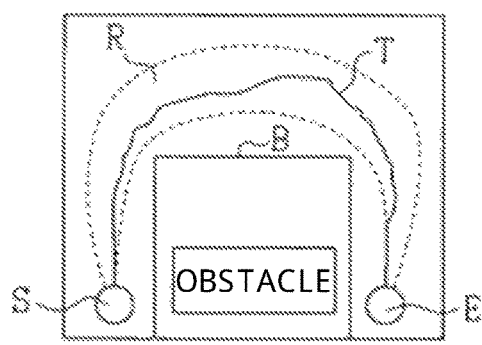

As shown in FIG. 4B, the controller 30 (corresponding to the region setting section 32) sets a tolerance region R around the trajectory T. The tolerance region R provides a tolerance around the motion points of the robot 20. The tolerance region R is established with a predetermined width (area) so as to include the trajectory T.

Figure 4C:
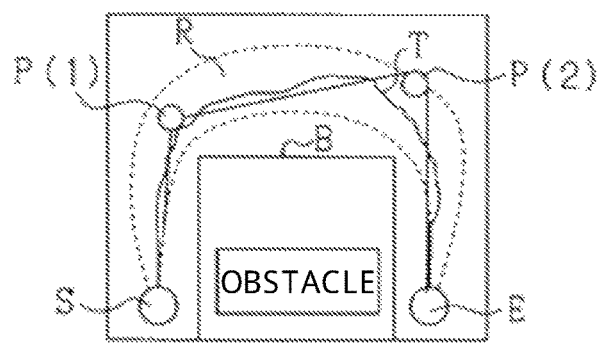

As shown in FIG. 4C, the controller 30 (corresponding to the point-group setting section 33) determines motion points P(1) and P(2) of the robot 20 in the tolerance region R. Then, between the start point S (one end) and the end point E (the other end) of the trajectory T, the controller 30 iterates a task of connecting a source motion point to a subsequent motion point through a straight line (line segment), avoiding the obstacle B to thereby set a motion-point group that is a collection of the motion points (start point S, motion points P(1) and P(2), and end point E). Requirements for setting the motion-point group are as follows.

(1) The straight lines connecting between motion points are approximate to the taught trajectory T as much as possible. (2) The straight lines connecting between motion points do not interfere with the obstacle B. (3) The number of motion points is minimized.

Figure 4D:
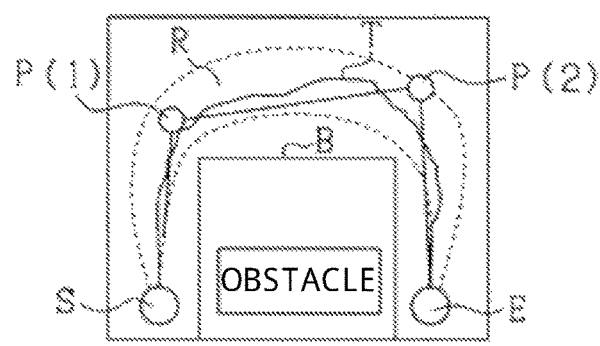

As shown in FIG. 4D, the controller 30 (corresponding to the program generating section 34) generates a motion program based on a motion-point group. For example, the controller 30 generates a motion program that can produce a trajectory in which the start point S, the motion points P(1) and P(2), and the end point E included in the motion-point group are sequentially connected through straight lines.

Figure 5:
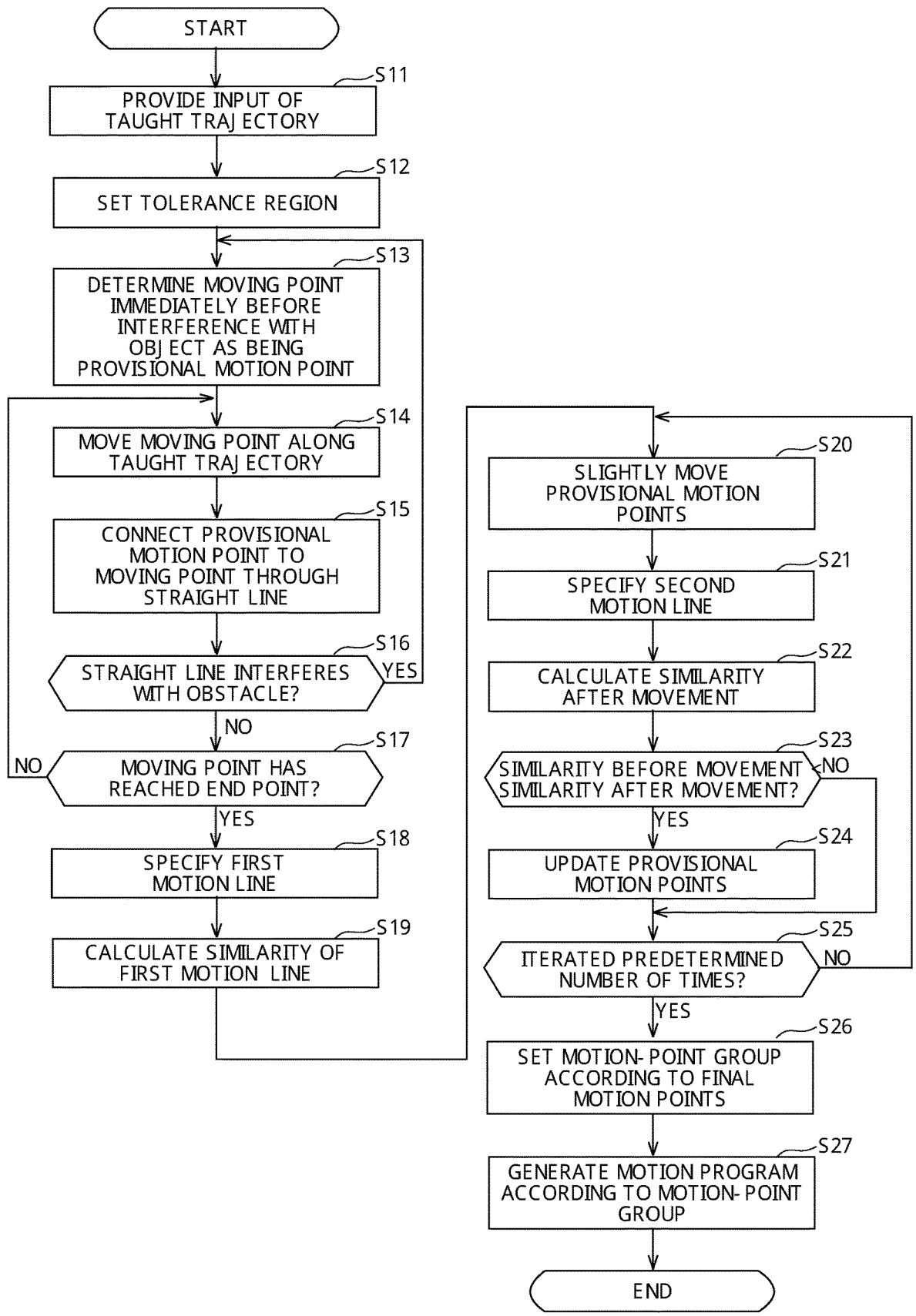
FIG. 5 is a flow diagram illustrating processing of generating a motion program.

FIG. 5 is a flow diagram illustrating processing of generating a motion program. In the processing, a series of steps are executed by the controller 30.

Figure 6A:
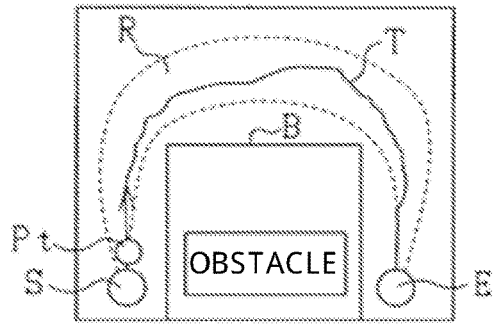
FIGS. 6A to 6D are schematic diagrams illustrating a mode of specifying a first motion line.

First, the controller 30 provides an input of the trajectory T taught by the user (step S11). The tolerance region R is set (step S12). Specifically, as shown in FIG. 6A, the tolerance region R with a predetermined width (area) is set around the trajectory T approximately centering thereon. The tolerance region R is apart from the obstacle B at least by a first distance but is not apart from the obstacle B by a second distance or more. The first distance allows the robot 20 to safely avoid the obstacle B. The second distance is a critical distance over which the robot 20 is excessively away from the obstacle B and reduces the motion efficiency thereof. The tolerance region R is established so as to have a larger width in the intermediate portion of the trajectory T than in both end portions (the start point S and the end point E) of the trajectory T. More specifically, the tolerance region R is established so as to have a larger width as it nears the intermediate portion of the trajectory T from both end portions thereof.

Then, a moving point Ptb (described later) immediately before interference with the obstacle B is determined as a provisional motion point Pp(n) (step S13). Initially, the start point S is determined as a provisional motion point Pp(0). From this determination onward, a moving point Pt immediately before interference with the obstacle B is determined as a provisional motion point Pp(n). It should be noted that the provisional motion point Pp(n) corresponds to a source motion point.

Figure 6B:
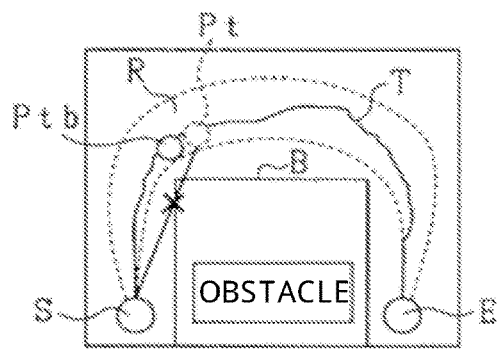

Then, the moving point Pt is chosen and moved from the provisional motion point Pp(n) along the trajectory T (step S14). It should be noted that the moving point Pt corresponds to the subsequent motion point. The provisional motion point Pp(n) is connected to the moving point Pt through a straight line (step S15). Then, it is determined whether the straight line has interfered with (contacted) the obstacle B (step S16). For example, at step S16, it is determined whether the start point S (provisional motion point Pp(0)) can be connected to the moving point Pt through a straight line, avoiding the obstacle B, or cannot be connected therethrough as shown in FIG. 6B. If the straight line is determined to have interfered with the obstacle B (YES at step S16), control returns to step S13. Specifically, as shown in FIG. 6B, a moving point Ptb immediately before interference with the obstacle B is determined, at step S13, as a provisional motion point Pp(n).

Figure 6C:
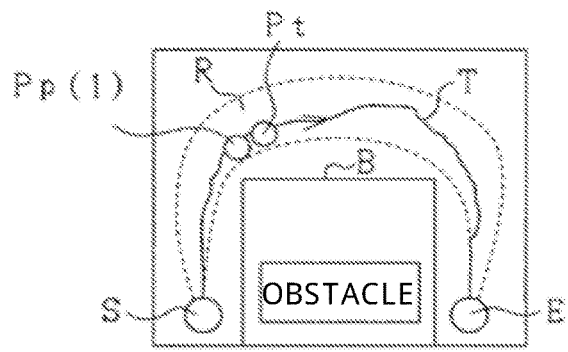

If the straight line is determined not to have interfered with the obstacle B (NO at step S16), it is determined whether the moving point Pt has reached the end point E (step S17). If the moving point Pt is determined not to have reached the end point E (NO at step S17), control returns to step S14. Specifically, as shown in FIG. 6C, the moving point Pt is chosen and moved, at step S14, from a provisional motion point Pp(1) along the trajectory.

Figure 6D:
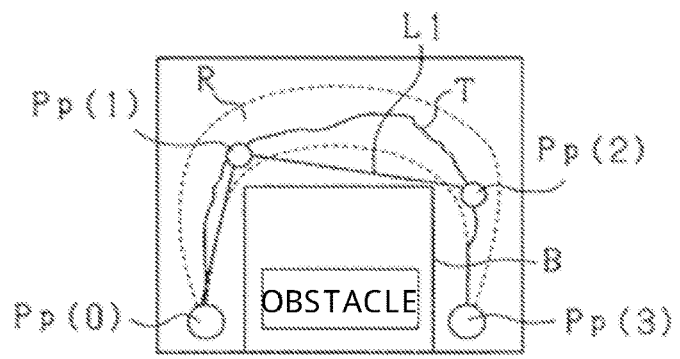

If the moving point Pt is determined to have reached the end point E (YES at step S17), the provisional motion points Pp(n) are sequentially connected through straight lines to specify a first motion line L1 (step S18, see FIG. 6D). Specifically, at step S18, the controller 30 iterates the task of connecting a provisional motion point Pp(n) to a moving point Pt through a straight line to specify the first motion line L1. It should be noted that the end point E is the last provisional motion point Pp(n).

Figure 7A:
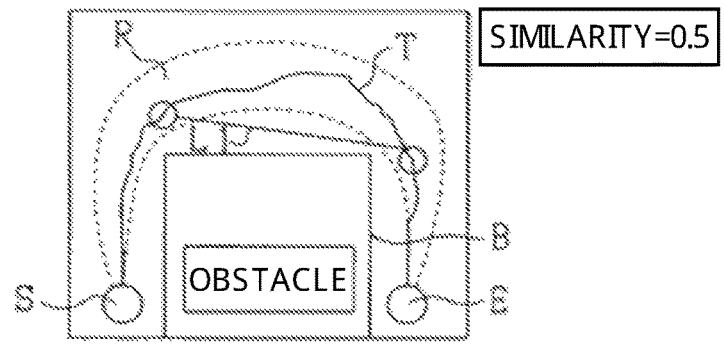
FIGS. 7A to 7D are schematic diagrams illustrating a mode of specifying a second motion line.

Then, a similarity between the taught trajectory T and the first motion line L1 is calculated (step S19). Specifically, a correlation coefficient between the coordinate points on the trajectory T and those on the first motion line L1 is calculated as a similarity. The correlation coefficient will be 1 if the two arrays completely agree with each other. For example, as shown in FIG. 7A, the similarity between the trajectory T and the first motion line L1 can be 0.5.

Then, the provisional motion points Pp(n) are slightly moved in the tolerance region R (step S20). Specifically, the provisional motion points Pp(n) are slightly moved in the respective directions for movement of the first motion line L1 to obtain a second motion line L2 which is expected to enhance the similarity to the trajectory T. The second motion line L2 is obtained by sequentially connecting between the slightly moved provisional motion points Pp(n) through straight lines. The directions expected to enhance the similarity are each calculated using a known optimization algorithm. It should be noted that the provisional motion points Pp(n) before the slight movement correspond to the motion points before position change, and the provisional motion points Pp(n) after the slight movement correspond to the motion points after position change. Then, the provisional motion points Pp(n) after the slight movement are sequentially connected through straight lines to specify the second motion line L2 (step S21, see FIG. 7B).

Figure 7B:
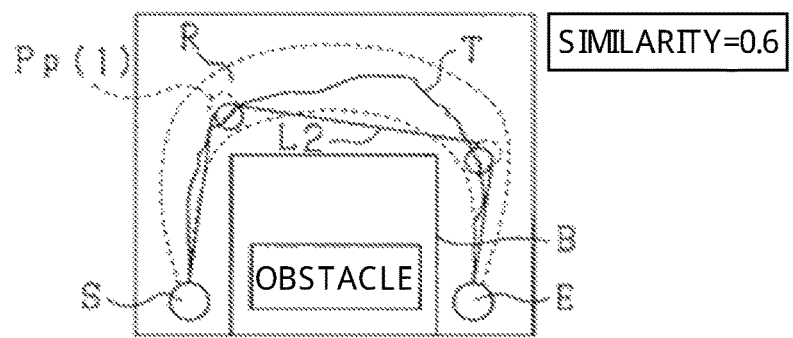

Then, a similarity between the taught trajectory T and the second motion line L2 is calculated (step S22). For example, as shown in FIG. 7B, the similarity between the trajectory T and the second motion line L2 can be 0.6. The controller 30 determines whether the similarity before moving the provisional motion points Pp(n) is higher than that after moving them (step S23). Initially, the similarity of the provisional motion points Pp(n) before movement is calculated between the trajectory T and the first motion line L1. From this calculation onward, the similarity is calculated between the trajectory T and an updated (described later) second motion line L2. If the similarity after movement is determined to be higher than that before movement (YES at step S23), the provisional motion points Pp(n) are updated to ones with the currently calculated similarity after the slight movement (step S24). If it is determined that the similarity after movement is not higher than that before movement (NO at step S23), control proceeds to step S25.

Then, it is determined whether steps S20 to S24 have been iterated a predetermined number of times (step S25). The predetermined number of times corresponds to the number of times where the increase in similarity is smaller than a predetermined value. Alternatively, the predetermined number of times may be determined such that the time taken for iterating steps S20 to S24 is shorter than a predetermined time. If the controller 30 determines that steps S20 to S24 have not been iterated the predetermined number of times (NO at step S25), processing is again executed from step S20.

Figure 7C:
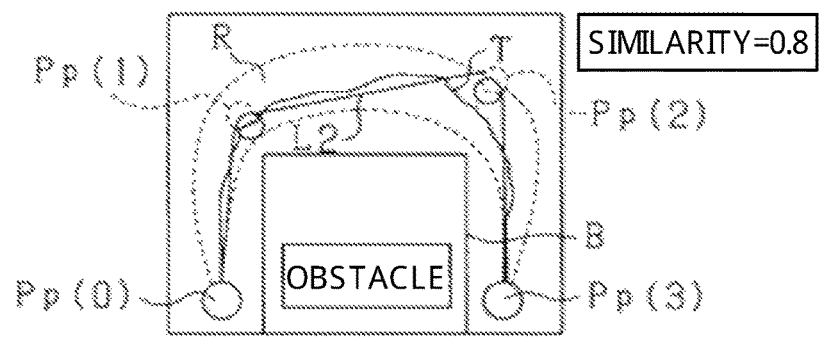
Figure 7D:
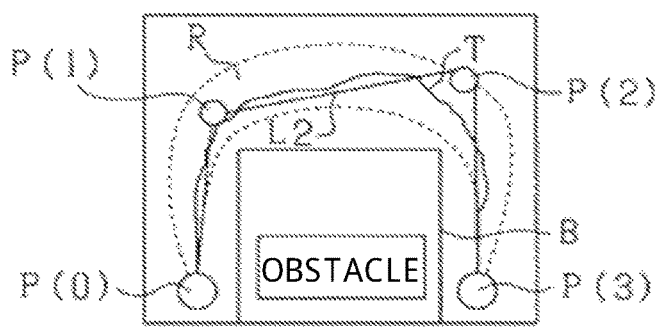

If the controller 30 determines that steps S20 to S24 have been iterated the predetermined number of times (YES at step S25), the updated final provisional motion points Pp(n) are set as a motion-point group that is a collection of the motion points P(n) of the robot 20 (step S26). Specifically, the controller 30 determines a collection of the provisional motion points specifying a second motion line L2 and maximizing the similarity to the trajectory T, as being a motion-point group. For example, as shown in FIG. 7C, the similarity can be 0.8 as a result of iterating steps S20 to S24 the predetermined number of times. The controller 30 determines the provisional motion points Pp(0) to Pp(3) specifying the second motion line L2 then, as being a motion-point group. Thus, as shown in FIG. 7D, the provisional motion points Pp(0) to Pp(3) are determined to be motion points P(0) to P(3).

Then, based on the determined motion-point group, a motion program is generated (step S27). Specifically, the controller 30 generates a motion program that can produce a trajectory in which the motion point P(0) (start point S), the motion points P(1) and P(2), and the motion point P(3) (end point E) included in the motion-point group are sequentially connected through straight lines. More specifically, the controller 30 generates a motion program so that a trajectory of the robot 20 can be produced with the updated final motion line L2. After that, the series of steps are ended (END).

It should be noted that step S11 corresponds to the processing as the trajectory inputting section 31, step S12 corresponds to the processing as the region setting section 32, steps S13 to S26 correspond to the processing as the point-group setting section 33, and step S27 corresponds to the processing as the program generating section 34.

The present embodiment specifically described above exerts the following advantageous effects.

An input of a trajectory T of the robot 20 taught by the user is provided. Then, a tolerance region R, which provides a tolerance around motion points P(n) of the robot 20, is established around the inputted trajectory T. Accordingly, the motion points P(n) of the robot 20 can be set not only on the trajectory T, but also around the trajectory T.

Provisional motion points Pp(n) of the robot 20 are determined in the tolerance region R. Then, starting from one end and ending at the other end of the trajectory T, the controller 30 iterates the task of connecting a source provisional motion point Pp(n−1) to a subsequent provisional motion point Pp(n) through a line segment, avoiding an obstacle B, to thereby set a motion-point group that is a collection of the motion points P(n). Thus, despite the possible variation in the taught trajectory T, motion points P(n) are appropriately determined for the setting of the motion-point group within the tolerance region R that includes the taught trajectory T. Then, a motion program is generated based on the set motion-point group. Consequently, the controller 30 is able to generate an appropriate motion program.

In the tolerance region R, the positions of the provisional motion points Pp(n) specifying a first motion line L1 are changed, and the provisional motion points Pp(n) at the changed positions are connected through straight lines to specify a second motion line L2. Then, if the similarity between the trajectory T and the second motion line L2 is higher than the similarity between the trajectory T and the first motion line L1, the collection of the provisional motion points Pp(n) specifying the second motion line L2 is determined as being a motion-point group. Thus, the collection of the provisional motion points Pp(n) specifying the motion line that is similar to the taught trajectory T can be set as a motion-point group. Accordingly, while setting an appropriate motion-point group in the tolerance region R, the controller 30 can generate a motion program that can produce a trajectory similar to the taught trajectory T.

In the tolerance region R, the controller 30 iterates the following task a predetermined number of times. The task involves changing the positions of the provisional motion points Pp(n) specifying a first motion line L1, and connecting between the provisional motion points Pp(n) at the changed positions through straight lines to specify a second motion line L2. Then, the collection of the provisional motion points Pp(n) specifying the second motion line L2 that maximizes the similarity to the trajectory T is set as a motion-point group. Accordingly, the controller 30 generates a motion program which can produce a trajectory closer to the taught trajectory T.

The controller 30 generates a motion program so that the second motion line L2 connecting the motion points P(n) through straight lines serves as a trajectory of the robot 20. Accordingly, the trajectory can avoid including many unwanted curved lines, thereby curbing lowering of motion efficiency.

The tolerance region R is established so as to include the trajectory T and have a larger width at the intermediate portion of the trajectory T than at both end portions of the trajectory T. Thus, at positions distanced from both end portions of the trajectory T, the motion points P(n) can be easily set avoiding the obstacle B. As a result, a trajectory with a simple shape can be produced.

The above embodiment may be modified and implemented as follows.

In the above embodiment, the tolerance region R is established so as to be wider as it nears the intermediate portion of the trajectory T from both end portions thereof. Alternatively, with the tolerance region R at the intermediate portion of the trajectory T being made wider than at both end portions thereof, the tolerance region R at the intermediate portion of the trajectory T may be permitted to have a uniform width.

If the inputted trajectory T is not appropriate, the first motion line L1 may closely pass by the obstacle B. In this regard, the controller 30 (corresponding to the point-group setting section 33) may change the positions of the provisional motion points Pp(n) specifying the first motion line L1 in the established tolerance region R. The change may be made such that the distance between the second motion line L2 and the obstacle B will be larger than a predetermined distance when the second motion line L2 is specified by connecting the provisional motion points Pp(n) at the changed positions through straight lines. With this configuration, the controller 30 can determine the collection of the provisional motion points Pp(n) specifying the second motion line L2 whose distance to the obstacle B is larger than a predetermined distance, as being a motion-point group. Accordingly, the controller 30 (corresponding to the program generating section 34) can generate a motion program that can produce a trajectory whose distance to the obstacle B is larger than a predetermined distance. Alternatively, the tolerance region R may be established such that the distance between the trajectory and the obstacle B will be larger than a predetermined distance, and then the second motion line L2 may be specified in the tolerance region R.

Figure 8:
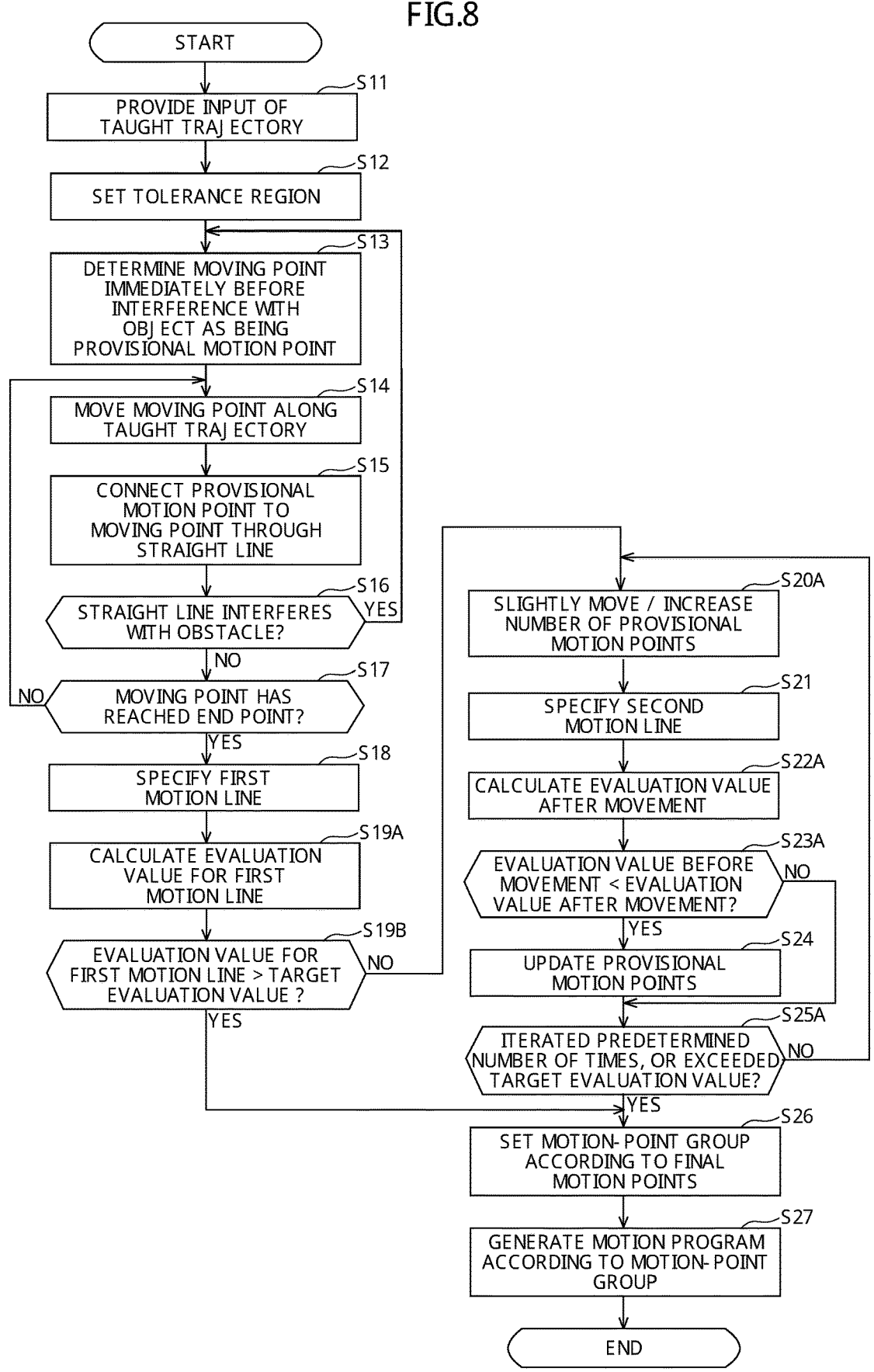
FIG. 8 is a flow diagram illustrating a modification of processing of generating a motion program.

FIG. 8 is a flow diagram illustrating a modification of the processing of generating a motion program. The processing of this modification is different from the processing shown in FIG. 5 in that the present modification includes a step of evaluating an approximation degree between an inputted trajectory T and a motion-point group, and that the step of changing the positions of the provisional motion points Pp(n) has been modified. In the present processing, a series of steps are executed by the controller 30. In the present processing, the same steps as those in the flow diagram shown in FIG. 5 are designated with the same step numbers to omit duplicate description.

Steps S11 to S18 are the same as those of FIG. 5. Subsequent to step S18, an evaluation value V is calculated for use in evaluating an approximation degree between a taught trajectory T and the first motion line L1 (step S19A). Specifically, the controller 30 calculates a correlation coefficient Cc between the coordinate points on the trajectory T and those on the first motion line L1. Then, a value obtained by multiplying a number n of the provisional motion points Pp(n) by a coefficient $\alpha$ ($0<\alpha<0.1$) is subtracted from the correlation coefficient Cc to calculate an evaluation value V ($V=Cc-\alpha \times n$). Then, it is determined whether the evaluation value V of the first motion line L1 is larger than a target evaluation value Vt (step S19B). For example, the target evaluation value Vt can be set to 0.7. If the evaluation value V of the first motion line L1 is determined to be larger than the target evaluation value Vt (YES at step S19B), control proceeds to step S26. Specifically, if the evaluation value V of the provisional motion points Pp(n) specifying the first motion line L1 exceeds the target evaluation value Vt (target approximate value), the controller 30 determines the collection of the provisional motion points Pp(n) specifying the first motion line L1, as being a motion-point group that is a collection of the motion points P(n) of the robot 20. If the evaluation value V of the first motion line L1 is determined not to be larger than the target evaluation value Vt (NO at step S19B), control proceeds to step S20A.

Then, the controller 30 slightly moves the provisional motion points Pp(n) in the tolerance region R, or increments the number of the provisional motion points Pp(n) by 1 (step S20A). As a specific example, the controller 30 slightly moves the provisional motion points Pp(n) within a predetermined range in a manner similar to the above embodiment, followed by incrementing the number of the provisional motion points Pp(n) by 1. Step S21 is the same as that of FIG. 5.

Then, an evaluation value V is calculated for use in evaluating the approximation degree between the taught trajectory T and the second motion line L2 (step S22A). The method of calculating the evaluation value V is the same as that of step S19A. The controller 30 determines whether the evaluation value V before moving the provisional motion points Pp(n) is higher than that after moving them (step S23A). If the evaluation value V after movement is determined to be higher than that before movement (YES at step S23A), the provisional motion points Pp(n) are updated to ones after the current slight movement (step S24). If the evaluation value V after movement is determined not to be higher than that before movement (NO at step S23A), control proceeds to step S25A.

Then, it is determined whether steps S20A to S24 have been iterated a predetermined number of times, or whether the evaluation value V has exceeded the target evaluation value Vt (step S25A). If the determination is negative (NO at step S25A), step S20A and onward are executed again. If an affirmative determination is made (YES at step S25A), control proceeds to step S26. It should be noted that step S19B corresponds to the processing as the target value setting section and the point-group setting section 33, and steps S13 to S26 correspond to the processing as the point-group setting section 33.

With the configuration described above, a motion program enabling production of a trajectory based on a minimum number of motion points P(n) is generated and thus the motion efficiency of the robot 20 is enhanced. Since a motion program is generated based on a minimum number of motion points P(n), the generated trajectory can avoid including unwanted curved lines in the event that the inputted trajectory T has varied, thereby curbing the lowering of motion efficiency. In addition, by changing at least the positions or the number of the provisional motion points Pp(n), the evaluation value V of the collection of the provisional motion points Pp(n) is ensured to exceed the target evaluation value Vt. Furthermore, as the number of the provisional motion points Pp(n) increases, the evaluation value V of the provisional motion points Pp(n) specifying the second motion line L2 is less likely to be determined as exceeding the target evaluation value Vt. Accordingly, the controller 30 can generate a motion program enabling production of a trajectory based on a minimum number of motion points P(n).

In the above embodiment, the first motion line L1 has been specified first and then the provisional motion points Pp(n) specifying the first motion line L1 have been slightly moved to thereby optimize the motion-point group where the approximation degree is maximized. Alternatively, without specifying the first motion line L1, the motion-point group may be optimized using a genetic algorithm or the like, so that the approximation degree is maximized in the tolerance region R. In this case, it is desirable that the number of the motion points P(n) be limited to prevent excessive increase.

In the above embodiment, the controller 30 has generated a motion program so that the second motion line L2 connecting the motion points P(n) through straight lines serves as a trajectory of the robot 20. Alternatively, the controller 30 may generate a motion program in which a motion line is produced using curved lines for connection between the motion points P(n) to serve as a trajectory of the robot 20. In this case as well, a motion program can be appropriately generated because the motion-point group that is the collection of the motion points P(n) is appropriately determined.

The number of the obstacle B is not limited to one but may be two or more. If there are two or more obstacles B, the controller 30 may determine, at step S16 of FIG. 5, whether any of the straight lines has interfered with (contacted) these obstacles B. If any of the straight lines has interfered with at least one obstacle B, control may proceed to step S13.

The robot 20 may be a horizontal articulated robot, or other robots.

What is claimed is:

1. A robot motion program generating apparatus that generates a motion program for moving a robot, avoiding an obstacle, comprising:
    a trajectory inputting section inputting a taught trajectory of the robot;
    a region setting section setting a tolerance region around the trajectory that is inputted by the trajectory inputting section, the tolerance region being a region providing a tolerance around motion points of the robot;
    a point-group setting section setting a motion-point group that is a collection of the motion points, by determining motion points of the robot in the tolerance region that is set by the region setting section, and iterating a task of connecting a source motion point to a subsequent motion point through a line segment, avoiding the obstacle, starting from one end and ending at the other end of the trajectory; and
    a program generating section generating the motion program, based on the motion-point group that is set by the point-group setting section.

2. The robot motion program generating apparatus according to claim 1, wherein the point-group setting section determines motion points on the trajectory that is inputted by the trajectory inputting section to specify a first motion line by iterating a task of connecting a source motion point to a subsequent motion point through a line segment, starting from one end and ending at the other end of the trajectory, changes positions of the motion points specifying the first motion line in the tolerance region to specify a second motion line by connecting between the position-changed motion points through line segments, and determines a collection of the motion points specifying the second motion line as being the motion-point group, in the case where a similarity between the trajectory and the second motion line is higher than a similarity between the trajectory and the first motion line.

3. The robot motion program generating apparatus according to claim 2, wherein the point-group setting section changes positions of the motion points specifying the first motion line in the tolerance region that is set by the region setting section, to iterate a task of specifying a second motion line a predetermined number of times by connecting between the position-changed motion points through line segments, and determines a collection of the motion points specifying a second motion line with a highest similarity to the trajectory as being the motion-point group.

4. The robot motion program generating apparatus according to claim 2, wherein, when changing positions of the motion points that specify the first motion line in the tolerance region set by the region setting section and specifying a second motion line by connecting between the position-changed motion points through line segments, the point-group setting section changes positions of the motion points so that a distance between the second motion line and the object is larger than a predetermined distance.

5. The robot motion program generating apparatus according to claim 3, wherein the point-group setting section is so configured to change positions of the motion points so that a distance between the second motion line and the object is larger than a predetermined distance, when changing positions of the motion points specifying the first motion line in the tolerance region that is set by the region setting section to specify a second motion line by connecting between the position-changed motion points through line segments.

6. The robot motion program generating apparatus according to claim 2, wherein, the program generating section generates the motion program so that the second motion line serves as a trajectory of the robot.

7. The robot motion program generating apparatus according to claim 3, wherein, the program generating section generates the motion program so that the second motion line serves as a trajectory of the robot.

8. The robot motion program generating apparatus according to claim 4, wherein, the program generating section generates the motion program so that the second motion line serves as a trajectory of the robot.

9. A robot motion program generating apparatus that generates a motion program for moving a robot, avoiding an obstacle, comprising:
- a trajectory inputting section inputting a taught trajectory of the robot;
- a region setting section setting a tolerance region around the trajectory inputted by the trajectory inputting section, the tolerance region being a region providing a tolerance around motion points of the robot;
- a point-group setting section setting a motion-point group that is a collection of the motion points, by determining motion points of the robot in the tolerance region set by the region setting section, and iterating a task of connecting a source motion point to a subsequent motion point through a line segment, avoiding the obstacle, starting from one end and ending at the other end of the trajectory;
- a target value setting section setting a target approximate value that is a target value approximating the motion-point group that is set by the point-group setting section to the trajectory that is inputted by the trajectory inputting section; and
- a program generating section generating the motion program, based on the motion-point group set by the point-group setting section, wherein, the point-group setting section carries out tasks of:
- determining a minimum number of motion points on the trajectory that is inputted by the trajectory inputting section to specify a first motion line by iterating a task of connecting a source motion point to a subsequent motion point through a line segment, starting from one end and ending at the other end of the trajectory;
- determining a collection of the motion points specifying the first motion line as being the motion-point group, in the case where an approximation degree of the collection of the motion points specifying the first motion line, relative to the trajectory, exceeds the target approximate value that is set by the target value setting section;
- changing at least positions or a number of the motion points specifying the first motion line in the tolerance region that is set by the region setting section, in the case where an approximation degree of the collection of the motion points specifying the first motion line, relative to the trajectory does not exceed the target approximate value that is set by the target value setting section, to specify a second motion line by connecting between the position-changed motion points through line segments;
- determining a collection of the motion points specifying the second motion line as being the motion-point group, in the case where an approximation degree of the collection of the motion points specifying the second motion line, relative to the trajectory, exceeds the target approximate value that is set by the target value setting section; and
- iterating a task of specifying the second motion line, in the case where an approximation degree of the collection of the motion points specifying the second motion line, relative to the trajectory does not exceed the target approximate value that is set by the target value setting section.

10. The robot motion program generating apparatus according to claim 9, wherein the point-group setting section is so configured that, as the number of the motion points increases, an approximation degree of the collection of the motion points specifying the second motion line, relative to the trajectory is less likely to be determined as exceeding the target approximate value that is set by the target value setting section.

11. The robot motion program generating apparatus according to claim 1, wherein the region setting section sets the tolerance region so as to have a larger width in an intermediate portion of the trajectory than in both end portions of the trajectory.

12. The robot motion program generating apparatus according to claim 2, wherein the region setting section sets the tolerance region so as to have a larger width in an intermediate portion of the trajectory than in both end portions of the trajectory.

13. The robot motion program generating apparatus according to claim 3, wherein the region setting section sets the tolerance region so as to have a larger width in an intermediate portion of the trajectory than in both end portions of the trajectory.

14. The robot motion program generating apparatus according to claim 4, wherein the region setting section sets the tolerance region so as to have a larger width in an intermediate portion of the trajectory than in both end portions of the trajectory.

15. The robot motion program generating apparatus according to claim 5, wherein the region setting section sets the tolerance region so as to have a larger width in an intermediate portion of the trajectory than in both end portions of the trajectory.

16. The robot motion program generating apparatus according to claim 6, wherein the region setting section sets the tolerance region so as to have a larger width in an intermediate portion of the trajectory than in both end portions of the trajectory.

17. The robot motion program generating apparatus according to claim 7, wherein the region setting section sets the tolerance region so as to have a larger width in an intermediate portion of the trajectory than in both end portions of the trajectory.

18. The robot motion program generating apparatus according to claim 8, wherein the region setting section sets the tolerance region so as to have a larger width in an intermediate portion of the trajectory than in both end portions of the trajectory.

19. The robot motion program generating apparatus according to claim 9, wherein the region setting section sets the tolerance region so as to have a larger width in an intermediate portion of the trajectory than in both end portions of the trajectory.

20. The robot motion program generating apparatus according to claim 10, wherein the region setting section sets the tolerance region so as to have a larger width in an intermediate portion of the trajectory than in both end portions of the trajectory.

* * * * *